(12) United States Patent
Callison et al.

(10) Patent No.: US 6,370,616 B1
(45) Date of Patent: Apr. 9, 2002

(54) MEMORY INTERFACE CONTROLLER FOR DATUM RAID OPERATIONS WITH A DATUM MULTIPLIER

(75) Inventors: Ryan A. Callison, Spring; Christopher Garza; Albert H. Chang, both of Houston; Hubert Brinkman, Spring, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/542,760

(22) Filed: Apr. 4, 2000

(51) Int. Cl.[7] .............. G06F 11/10; G06F 11/16
(52) U.S. Cl. .................................. 711/114; 713/6
(58) Field of Search .................. 708/232; 711/114, 711/112; 713/6, 8

(56) References Cited

U.S. PATENT DOCUMENTS

| | | | |
|---|---|---|---|
| 4,763,330 A | * 8/1988 | Shimizu | 714/785 |
| 5,206,943 A | 4/1993 | Callison et al. | |
| 5,408,644 A | 4/1995 | Schneider et al. | |
| 5,737,744 A | 4/1998 | Callison et al. | 711/114 |
| 5,742,752 A | * 4/1998 | DeKoning | 714/6 |
| 5,896,493 A | * 4/1999 | Rao | 714/6 |
| 5,950,225 A | * 9/1999 | Kleiman | 711/111 |
| 6,070,182 A | * 5/2000 | Rao et al. | 708/708 |
| 6,112,255 A | * 8/2000 | Dunn et al. | 710/7 |
| 6,138,125 A | * 10/2000 | DeMoss | 707/202 |
| 6,145,043 A | * 11/2000 | Sych et al. | 710/126 |
| 6,148,430 A | * 11/2000 | Weng | 714/770 |
| 6,151,641 A | * 11/2000 | Herbert | 710/22 |
| 6,161,165 A | * 12/2000 | Solomon et al. | 711/114 |

OTHER PUBLICATIONS

Striping in a RAID Level 5 Disk Array, Peter M. Chen and Edward K. Lee, pp. 1–14.

RAID–II: Design and Implementation of a Large Scale Disk Array Controller, R.H. Katz, P.M. Chen, A.L. Derapeau, E.K. Lee, K. Lutz, E.L. Miller, S. Seshan, D.A. Patterson, Oct. 6, 1992, pp. 1–17.

(List continued on next page.)

Primary Examiner—B. James Peikari
(74) Attorney, Agent, or Firm—Akin, Gump, Strauss, Hauer & Feld, LLP

(57) ABSTRACT

A memory interface controller employs a DATUM multiplier within a destination address to perform DATUM RAID operations. If destination data is in an XOR memory address space, then the multiplier can indicate to multiply source data by the multiplier and XOR that resulting data with the destination data. The DATUM multiplier can be read in response to detection of a memory command. The multiplier alternatively can be used in connection with an input/output bus write command to write source data from the input/output address space to an XOR memory address space. In response to such a write command, the input/output bus data in the input/output address space is multiplied by the multiplier; that resulting data is XORed with the destination data in the XOR memory address space. The multiplier in this case can be within an input/output bus address associated within the input/output bus data.

25 Claims, 10 Drawing Sheets

OTHER PUBLICATIONS

Compaq Smart Array Controller Technology, Compaq Computer Corporation, TechCom@compaq.com., Jun. 1998, pp. 1–18.

Maximizing Performance in a Striped Disk Array, Peter M. Chen and David A. Patterson.

Declustered Disk Array Architectures with Optimal and Near–Optimal Parallism, Guillermo A. Alvarez, Walker A. Burkhard, Larry J. Stockmeyer and Flaviu Christian, Technical Report CS98–576, CSE, UCSD, Feb. 1998, pp. 1–25.

Tolerating Multiple Failures in RAID Architectures with Optimal Storage and Uniform Declustering, Guillermo A. Alvarez, Walter A. Burkhard and Flaviu Cristian, Proceedings on the $24^{th}$ Annual ACM/IEEE International Symposium on Computer Architecture (ISCA '97).

IDA–based Redundant Arrays of Inexpensive Disks, Azer Bestavros, Proceedings of the IEEE International Conference on Parallel and Distributed Information Systems (PDIS), Dec. 1991.

SETH: A VLSI chip for the Real–Time Information Dispersal and Retrieval for Security and Fault–Tolerance, Azer Bestavros, 1990 International Conference on Parallel Processing, Aug. 1990, pp. 457–464.

\* cited by examiner

| |
|---|
| assign z [7:0] = 8'hd4; |
| assign w_out [7] = (w_in [6] ^ (x [7] & y) ^ (z [7] & w_in [7]); |
| assign w_out [6] = (w_in [5] ^ (x [6] & y) ^ (z [6] & w_in [7]); |
| assign w_out [5] = (w_in [4] ^ (x [5] & y) ^ (z [5] & w_in [7]); |
| assign w_out [4] = (w_in [3] ^ (x [4] & y) ^ (z [4] & w_in [7]); |
| assign w_out [3] = (w_in [2] ^ (x [3] & y) ^ (z [3] & w_in [7]); |
| assign w_out [2] = (w_in [1] ^ (x [2] & y) ^ (z [2] & w_in [7]); |
| assign w_out [1] = (w_in [0] ^ (x [1] & y) ^ (z [1] & w_in [7]); |
| assign w_out [0] = (x [0] & y) ^ (z [0] & w_in [7]); |

FIG. 6

```
m8bit_stage m8bit_stage_7(
    8'h0,
    x [7:0],
    y [7],
    z [7:0],
    w_out_7 [7:0]
);
```

```
m8bit_stage m8bit_stage_6(
    w_out_7,
    x [7:0],
    y [6],
    z [7:0],
    w_out_6 [7:0]
);
```

```
m8bit_stage m8bit_stage_5(
    w_out_6,
    x [7:0],
    y [5],
    z [7:0],
    w_out_5 [7:0]
);
```

```
m8bit_stage m8bit_stage_4(
    w_out_5,
    x [7:0],
    y [4],
    z [7:0],
    w_out_4 [7:0]
);
```

FIG. 7A

```
m8bit_stage m8bit_stage_3(
    w_out_4,
    x [7:0],
    y [3],
    z [7:0],
    w_out_3 [7:0]
);
```

```
m8bit_stage m8bit_stage_2(
    w_out_3,
    x [7:0],
    y [2],
    z [7:0],
    w_out_2 [7:0]
);
```

```
m8bit_stage m8bit_stage_1(
    w_out_2,
    x [7:0],
    y [1],
    z [7:0],
    w_out_1 [7:0]
);
```

```
m8bit_stage m8bit_stage_0(
    w_out_1,
    x [7:0],
    y [0],
    z [7:0],
    w_out_0 [7:0]
);
```

FIG. 7B

MEMORY INTERFACE CONTROLLER FOR DATUM RAID OPERATIONS WITH A DATUM MULTIPLIER

CROSS REFERENCE TO RELATED APPLICATIONS

The following patent applications are incorporated herein by reference in their entirety for all purposes:

U.S. patent application Ser. No. 09/542,624, entitled RAID XOR OPERATIONS TO SYNCHRONOUS DRAM USING A READ BUFFER, filed concurrently by Ryan A. Callison, William C. Galloway, Christopher Garza and Albert H. Chang;

U.S. patent application. Ser. No.09/542,309, entitled DYNAMIC ROUTING OF DATA ACROSS MULTIPLE DATA PATHS FROM A SOURCE CONTROLLER TO A DESTINATION CONTROLLER, filed concurrently by Hubert E. Brinkrann, Jr. and Ryan A. Callison;

U.S. patent application, Ser. No.09/542,969 entitled PROVIDING DATA IN RESPONSE TO A READ COMMAND THAT MAINTAINS CACHE LINE ALIGNMENT, filed concurrently by Jeff M. Carlson and Ryan A. Callison;

U.S. patent application Ser. No. 09/542,157, entitled DISCONNECTING A DEVICE ON A CACHE LINE BOUNDARY IN RESPONSE TO A WRITE COMMAND, filed concurrently by Jeff M. Carlson and Ryan A. Callison; and U.S. patent application Ser. No. 09/542,420, entitled DYNAMIC REMAPPING OF ADDRESS REGISTERS FOR ADDRESS TRANSLATION BETWEEN MULTIPLE BUSSES, filed concurrently by Hubert E. Brinkmann, Jr. and Ryan A. Callison.

BACKGROUND OF THE INVENTION

1. Field of the Invention

The present invention generally relates to multiple data drive recovery in connection with RAID architectures, and more particularly to a memory interface controller for DATUM RAID operations with a DATUM multiplier.

2. Description of the Related Art

Due to the increasing importance of business-critical data to many companies, fault tolerance is often a priority for network storage systems. Fault tolerance, in the context of a disk array subsystem, is the ability of a disk array to continue to perform its functions even when one or more disks have failed. Parity RAID and declustering architectures are network storage solutions commonly utilized to provide fault tolerance against a single disk failure. RAID, which stands for Redundant Array of Inexpensive Disks, relates to the concept of using multiple inexpensive disks as one unit in the place of a single large disk, for improved storage reliability and system performance. This idea, which is now the industry standard, was introduced in a December 1987 article entitled"A Case for Redundant Arrays of Inexpensive Disks (RAID)" by D. Patterson, G. Gibson, and R. H. Katz.

To date, a variety of RAID architectures (industry and proprietary) have been utilized for network storage. RAID 5, which utilizes parity information to provide redundancy and fault tolerance, is one example. RAID 5 architecture uses data striping to spread or interleave user data and redundancy information (e.g., parity) across all the disks in an array. Striping generally refers to spreading data evenly over multiple disks. In other words, a segmented data block is broken into segments of a unit length and sequential segments are written to sequential disk drives. The combination of corresponding sequential data segments across each of the disks is referred to as a stripe. In the event of a failed disk, the parity information allows for recovery or reconstruction of the data of the failed disk. Parity declustering is the uniform distribution of user data and parity data over a disk array where each stripe uses a subset of the disks.

In contrast to parity declustering and conventional RAID architectures, certain disk array architectures mask multiple simultaneous disk failures. One advantage of such architectures is handling of latent sector errors. A sector error can be discovered when an array has already suffered a failure. Another advantage of architectures capable of tolerating multiple concurrent failures is handling of communication failures since communication failures can render disks inaccessible. DATUM, which stands for Disk Arrays with optimal storage, Uniform declustering and Multiple-failure tolerance, is an example of an array architecture for masking or tolerating multiple disk failures in disk arrays. In terms of uniform declustering, the architecture basically provides an array layout of user data and redundancy data which distributes redundancy data evenly or uniformly among disks in the array. Most declustered disk array layouts that can tolerate a single failure can be characterized by certain desirable properties. For example, to recover from a single disk crash, no two units of the same stripe are matched to the same disk. Another desirable property is distributed parity, whereby all disks have the same number of parity or check units mapped to them. A further desirable property, termed distributed reconstruction, involves providing a constant number of stripes with units mapped to both disks for every pair of disks.

In terms of optimal storage, DATUM uses a theoretical minimum amount of storage space for storing redundancy data in the array. DATUM employs an information dispersal algorithm (IDA) to uniformly distribute redundancy data on all the disks. The IDA algorithm encodes a sequence $E=(d_1, d_2, \ldots, d_m)$ of m integers into a sequence of m+f integers $(e_1, e_2, \ldots, e_m, e_{m+1}, \ldots, e_{m+f})$ in such a way that any m of the m+f integers suffice to recover a sequence F. The sequence F represents m equal-sized portions of user or client data, and m+f values represents encoded data including redundancy data. The transformation of user data into encoded data by the IDA algorithm can be represented in the form of a m×(m+j) matrix T (i.e., a matrix having m linear independent columns and m+f rows). Both user data and redundancy data are organized in terms of striping units. Disk space is logically structured into striping units, where each striping unit has a fixed number of sectors. A stripe consists of a fixed number of user data stripe units and a number of redundant stripe units. Different striping units of the same stripe are mapped to different disks. In other words, units of the same strip are not stored in the same disk. Any data stripe can be reconstructed if m or more disks are correct; that is, if or fewer disks have failed. DATUM thus uses only the theoretical minimum amount of disk space to store each stripe so that its contents are recoverable even if stripe units are missing.

Aside from storage space, DATUM is also optimal with respect to write overhead. That is, DATUM performs the minimum number of disk accesses to implement small writes. A small write occurs when a single stripe unit is written by a client application. A small write for a parity redundancy RAID architecture has generally reduced disk array performance. To implement a small write with DATUM, it has been necessary to (i) read the old values of the data unit being written and the f redundant units, (ii) recompute the check stripe unit values, and (iii) write the new data stripe value as well as the f check stripe units. Since it has not been possible to write less than f +1 stripe units if the array is to tolerate up to f failures, DATUM performs the optimal number f +1 disk writes per small write operation.

DATUM is considered the first known technique for tolerating an arbitrary number of failures that is optimal with respect to both storage space and write overhead, and that distributes redundant data uniformly by using a set of layout functions that can be evaluated efficiently with very low memory requirements. With DATUM, the size of a redundant unit is independent of the number of units per stripe. Further details regarding DATUM can be found in an article entitled"Tolerating Multiple Failures in RAID Architectures with Optimal Storage and Uniform Declustering" by Guillermo A. Alvarez, Walter A. Burkhard and Flaviu Cristian, Department of Computer Science and Engineering, University of California, San Diego, which is incorporated herein by reference as if set forth in its entirety.

SUMMARY OF THE INVENTION

Briefly, a memory interface controller employs a DATUM multiplier within a destination address to perform DATUM RAID operations. If destination data is in an XOR memory address space, then the multiplier can indicate to multiply source data by the multiplier and XOR that resulting data with the destination data. The DATUM multiplier can be read in response to detection of a memory command.

The multiplier alternatively can be used in connection with an input/output bus write command to write source data from the input/output address space to an XOR memory address space. In response to such a write command, the input/output bus data in the input/output address space is multiplied by the multiplier; that resulting data is XORed with the destination data in the XOR memory address space. The multiplier in this case can be within an input/output bus address associated with the input/output bus data.

BRIEF DESCRIPTION OF THE DRAWINGS

A better understanding of the present invention can be obtained when the following detailed description of the preferred embodiment is considered in conjunction with the following drawings, in which:

FIG. 6 is a table of exemplary hardware description language code statements related to multiplication logic for handling DATUM RAID operations;

FIGS. 7A and 7B illustrate a table of additional exemplary hardware description language code statements related to multiplication logic for handling DATUM RAID operations;

DETAILED DESCRIPTION OF PREFERRED EMBODIMENT

Figure 1:
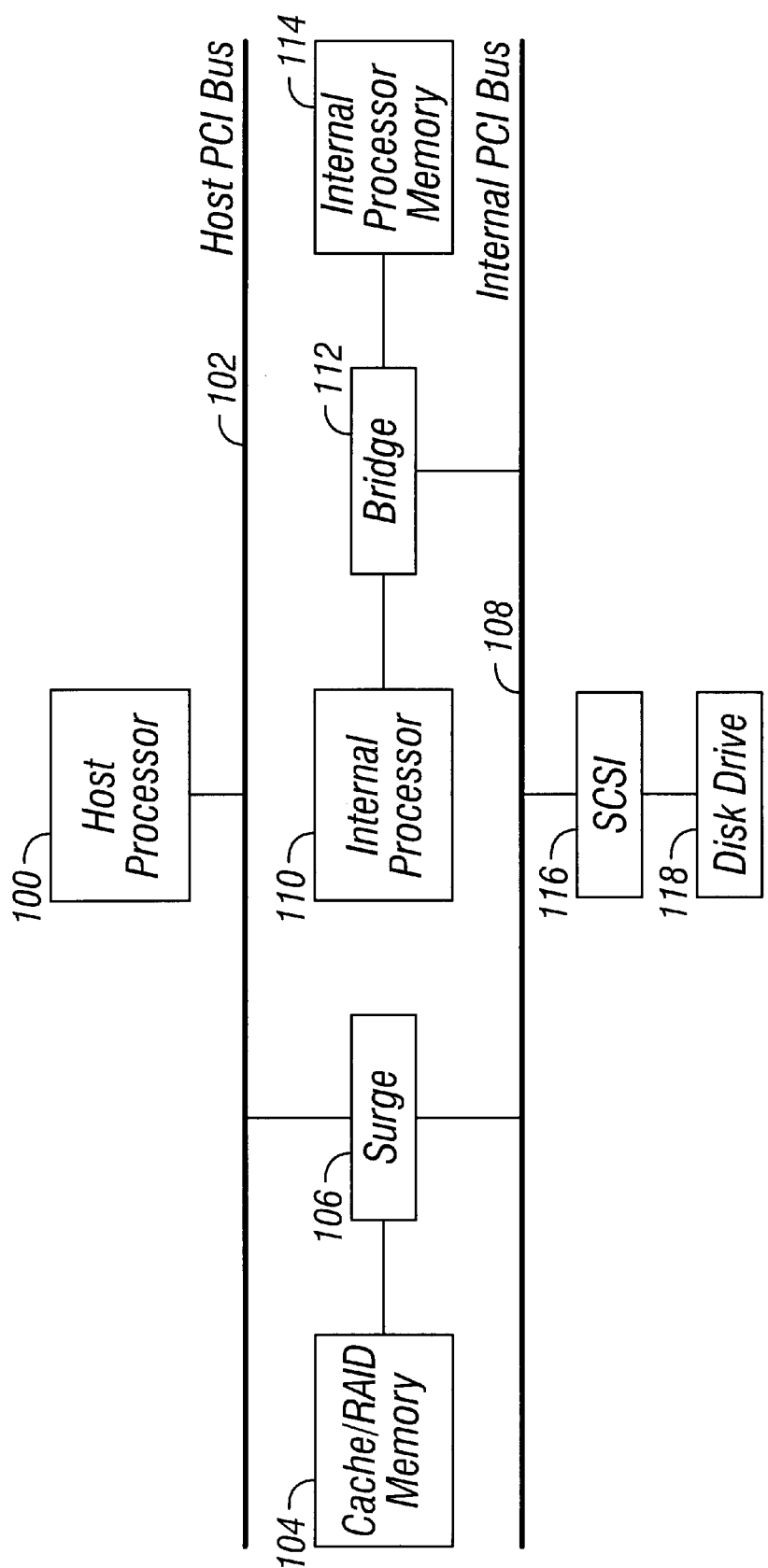
FIG. 1 is a block diagram of a computer system including a bus/memory interface device.

Referring now to FIG. 1, a block diagram of a disk subsystem 101 is shown. A Host Processor 100 is connected to a host PCI (Peripheral Component Interconnect) bus 102, which provides a communications channel to other components of a host computer system (not shown). The disk controller 101 also includes an internal PCI bus 108, which, like the host PCI bus 102, includes a control portion and a multiplexed address and data portion. Both buses 102 and 108 are capable of 66 MHz and 64-bit operation. For a description of the PCI bus standard, refer to PCI Specification, Revision 2.2, (December 1998), Intel Corporation of Santa Clara, Calif., which is hereby incorporated by reference as if set forth in its entirety.

Coupled to the internal PCI bus 108 is an internal or local processor 110 that controls the functions of the devices coupled to the internal PCI bus 108, for example. The Internal Processor 110 is coupled to a Internal Processor memory 114. Both the Internal Processor 110 and the Internal Processor memory 114 are coupled through a processor PCI bridge 112 to the internal PCI bus 108. The Internal Processor 110 executes firmware stored in the Internal Processor memory 114 to perform various disk controller functions.

The processor PCI bridge 112 can be implemented with an ASIC. Further, the processor PCI bridge 112 can include logic for converting processor memory or I/O cycles into PCI cycles, and as well can include processor-to-PCI write posting buffers. The processor-PCI bridge 112 also can include a memory controller for controlling operations to the Internal Processor memory 114. Additionally, interval timers and an interrupt controller are included in the processor-PCI bridge 112.

Also connected to the internal PCI bus 108 is at least one SCSI controller 116 for interfacing with a disk drive 118. Multiple SCSI controllers and associated disk drives may be added to create a disk array subsystem.

Transactions between the host PCI bus 102 and the internal PCI bus 108 are bridged by a bus/memory interface device 106. The bus/memory interface device 106 has at least two modes of operation. In one mode, the bus/memory interface device 106 operates as a"pass-through"or PCI-to-PCI bridge device, directly passing transactions between the host PCI bus 102 and the internal PCI bus 108. The bus/memory interface device 106 also operates in a non-bridge mode, whereby transactions between the host PCI bus 102 and the internal PCI bus 108 are first translated by the bus/memory interface device 106 before being sent to their destination.

In the non-bridge mode, the bus/memory interface device 106 provides address and data translation between two or more bus interfaces, specifically between buses having non-matching address spaces. Where a conflict exists between an address in the address space for the Internal Processor 110 or the internal PCI bus 108 and an address in the address space for the Host Processor 100 or the host PCI bus 102, the bus/memory interface device 106, in the non-bridge mode, remaps the incoming transaction and translates the address originating from the originating bus into a different, but corresponding, outgoing address within the address space of the receiving or destination bus. Additionally, the bus/memory interface device 106 performs its address translations in a bidirectional manner. For example, a request issued by the Host Processor 100 passes from the host PCI bus 102 in the host PCI address space to the bus/memory interface device 106. The incoming address is then translated to the appropriate corresponding address within the address space of the internal PCI bus 108. Likewise, the Internal Processor 110 communicates with the Host Processor 100 by issuing a request in its internal PCI bus address space to the bus/memory interface device 106 where the request is translated to a corresponding address within the address space for the host PCI bus 102. Conventional PCI bridges have performed address translation.

The translation task is performed by the bus/memory interface device 106 using a system of internal programmable translation registers. The translation registers may be programmed on a per access basis by any device involved in a particular transaction. This allows all translations to occur between differing address spaces, dynamically, at a run-time level. For example, a first transaction may be initiated by a device instructing the bus/memory interface device 106 to configure its translation registers in a certain manner to allow a first translation between a first set of address spaces. The translation for that particular transaction is performed according to that configuration. A second transaction which requires translation between a second set of address spaces, different from the first set, is initiated when the requesting device instructs the bus/memory interface device 106 to reconfigure the translation registers to allow for the second transaction. In this way, a run-time change in communications among various bus interfaces is handled by dynamically reconfiguring the translation registers in the appropriate manner. Dynamic reconfiguration will be discussed below in more detail.

Here a memory storage device 104 is provided as a third interface to the bus/memory interface device 106. Here again, the bus/memory interface device 106 operates in either a bridge mode, merely passing transactions directly to the memory device 104 over the memory bus 130, or in a non-bridge or I2O mode, where requests from either the host PCI bus 102 or the internal PCI bus 108 are translated into the memory space of the memory device 104. The memory device 104 may be used either for cache memory operations and/or for RAID memory operations. While PCI I/O cycles are forwarded from the host PCI bus 102 to the internal PCI bus 108 for the bridge mode, PCI I/O cycles are not claimed by the internal PCI bus 108 in the non-bridge mode. Instead, a PCI I/O window in the bus/memory interface device 106 is opened so that the Host Processor 100 can communicate with the local processor 110.

Providing cache memory off of the bus/memory interface device 106 allows for cefficient internal bus utilization through increased cache bandwidth, simultaneous host PCI bus and internal PCI bus memory operations and optimized control of bus performance. In addition, both RAID and cache operations share the same memory.

The bus/memory interface device 106 is therefore capable of operating between any number of bus interfaces. Furthermore, the bus/memory interface device 106 performs the translation function in a multi-directional manner. Therefore any request originating from any interface may be dynamically translated to the appropriate address within the address space for any other destination bus interface.

Any number of bus/memory interface devices 106 and the accompanying memory device 104 may be included in a system to create an external array architecture. The advantages of multiple bus interface devices include considerably increased cache capacity, thereby increasing memory bandwidth and increased data throughput via multiple data passages. The bus/memory interface device 106 in such a multi-device architecture provides automatic routing of command or data information among and between the various communication devices and memory via pre-specified address ranges.

Figure 2:
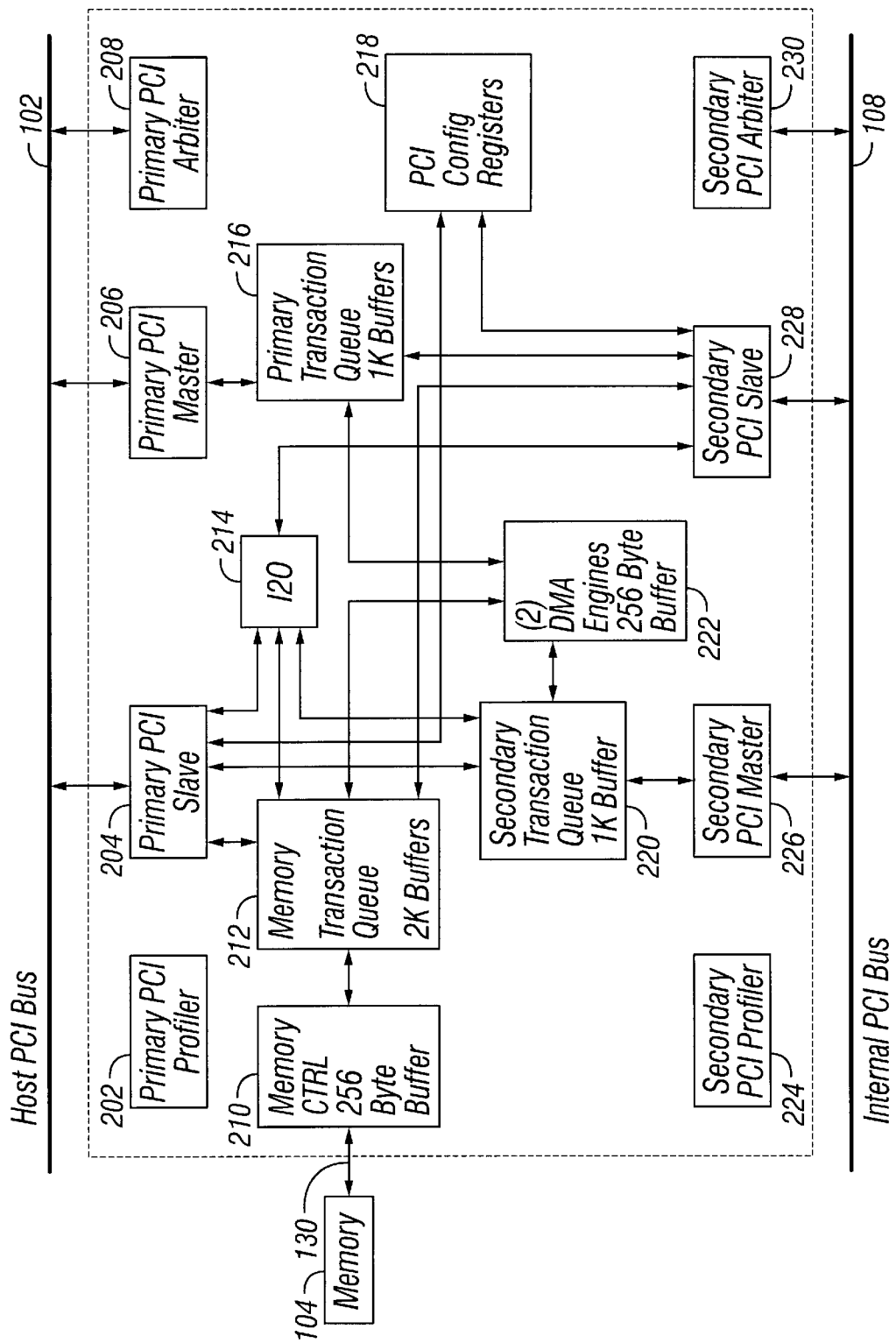
FIG. 2 is a block diagram of exemplary internal components of the bus/memory interface device of FIG. 1.

Referring now to FIG. 2, a more detailed block diagram of the bus/memory interface device 106 is shown. The bus/memory interface device 106 connects to three external interfaces: the Host PCI Bus 102, the Secondary PCI Bus 108 and the Memory Bus 130. Each of the bus interfaces 102, 108 and 130 represents a different address space for the bus/memory interface device 106. The two DMA Engines 222 and the I2O control block 214 reference each bus interface as independent memory maps. Each memory space is encoded within the data structures of the DMA Engines 222 and then specified to the I2O Control Block 214 via configuration registers within the set of PCI Configuration Registers 218.

The two DMA Engines 222 are used for the automatic transfer of data for caching operations and for high speed execution of RAID operations, for example XOR functions. Each engine is capable of moving data among the three memory spaces for the host PCI bus 102, the secondary PCI bus 108 and the memory bus 130. To carry out the task of moving data between the memory spaces, the two DMA Engines 222 interface with three Transaction Queues, each transaction queue associated with one of the three bus interfaces. Therefore, the DMA Engines 222 interface with the host PCI bus 102 via the host PCI transaction queue 216. The DMA Engines 222 interface with the internal or secondary PCI bus 108 via the secondary PCI transaction queue 220. Finally, the DMA Engines 222 interface with the Memory bus 130 via the Memory transaction queue 212.

The data structures for each of the three memory maps which are encoded within the DMA Engines 222 are also utilized by the I2O Control Block 214. The I2O Control Block 214 provides a means for the host Processor 100, the Internal Processor 110 or other input/output processor (IOP) located on the Secondary PCI bus 108 to communicate by passing inbound and outbound messages in message frames. The I2O Control Block 214 supports the industry standard interface defined in the Intelligent I/O Architecture (I2O) Specification, v 1.5, which is hereby incorporated by reference as if set forth in its entirety. Like the DMA Engines 222, the I2O Control Block 214 also interfaces with each of the three Transaction Queues 212, 216 and 220 to provide communication among and between the Host PCI Bus 102, the Secondary PCI Bus 108 and the Memory Bus 130. The I2O Control Block 214 operates in one of two modes: push and pull. In the I2O push model, the Host processor 100 writes a message frame to be communicated directly into the IOP's local memory. In the I2O pull model, the Host processor 100 writes the message frame to be communicated into host memory and allows the bus/memory interface device's 106 DMA Engines 222 to copy the message frame from host memory to the IOP memory. The I2O Control Block 214 is further connected to the Host PCI Bus 102 and the Secondary PCI bus 108 via the PCI Slaves 204 and 228, respectively.

The PCI Slaves 204 and 228 provide access gateways among the Host PCI Bus 102 and the secondary PCI Bus 108 as well as to the Transaction Queues 212, 216 and 220 of the other interfaces. The PCI Slaves 204 and 228 also conduct priority decoding of transactions having conflicting address ranges.

The PCI master devices 206 and 226 provide the primary PCI finctions for the bus/memory interface device 106 and are effectively compliant with the 2.1 revision of the PCI Specification. PCI Masters 206 and 226 control all transfers to their respective bus. Each PCI Master communicates with its associated transaction queue to determine the timing of the data transfers. Specifically, the Host PCI Master 206 requests control of the Host PCI Bus 102 when the appropriate amount of data is available in the Host PCI Transaction Queue 216. Likewise the Secondary PCI Master 226 requests control of the Secondary PCI Bus 108 when the Secondary PCI Transaction Queue 220 contains the appropriate amount of data. Each PCI Master is likewise capable of maintaining cache-line boundaries for read operations and each PCI slave is capable of maintaining cache-line boundaries for write operations. Maintaining cache-line boundaries for all transactions optimizes bus utilization by the bus/memory interface device 106.

As described above, the Transaction Queues 212, 216 and 220 provide the bridging mechanism between the different bus interfaces. There are three Transaction Queues, each dedicated to one of the three bus interfaces. The Host Transaction Queue 216 bridges transactions and operations to the Host PCI Master 206 onto the Host PCI Bus 102. The Secondary PCI Transaction Queue 220 bridges transactions to the Secondary PCI Master 226 onto the secondary PCI Bus 108. Finally, the Memory Transaction Queue 212 bridges memory accesses to the Memory Controller 210 and the SDRAM Memory 104. Certain of the Transaction Queues also communicate directly between the two PCI Slaves 204 and 228, the I2O control block 214 and the two DMA Engines 222.

In carrying out its function of bridging each of the bus interfaces, the Transaction Queues perform various subfunctions. First, all PCI master operations can be initiated by the associated transaction queue. The appropriate transaction queue sends a start pulse and all necessary transaction information in order to enable the PCI master to initiate a transaction. In addition, the Transaction Queues perform conflict resolutions among conflicting access requests. Each respective transaction queue determines which requesting source has access using a predetermined priority scheme. A higher priority request is given immediate access to the queue while lower priority request are held and retried for later acceptance. The Transaction Queues are also capable of determining how much data to pre-fetch for certain types of accesses from system devices which have known characteristics. Finally, the memory transaction queue 212 controls memory access requests to and from the SDRAM 104 by sending read and/or write instructions for the memory controller 210 to execute.

The PCI Profilers 202 and 224 are used to determine the amount of data that the transaction queue should pre-fetch for certain transactions on a per device basis. The transaction queue receives a selected profile for each transaction from its associated profiler.

The primary function of the Memory Controller 210 is to service memory requests from the Memory Transaction Queue 212. Specifically, the Memory Controller 210 translates instructions from the Memory Transaction Queue 212 into the proper format of read and/or write requests. The bus/memory interface device 106 supports all SDRAM architectures of varying density and speed by having registers define the number of row and column address bits and certain delay parameters.

Implemented within the bus/memory interface device 106 can be a data protection scheme for RAID (redundant array of inexpensive drives) systems which provides a technique of allowing the system to experience multi-drive failures. Specifically, a multiplier is provided in connection with the Memory Transaction Queue 212 to extend the capabilities of typical RAID operations.

All transactions over the Host PCI Bus 102 and the Secondary PCI Bus 108 communicating with the bus/memory interface device 106 are prioritized according to an arbitration algorithm compliant with the PCI Specification, 2.1 revision. The arbitration algorithm is controlled in the Host PCI Arbiter 208 and the Secondary PCI Arbiter 230.

The architectures shown in FIGS. 1 and 2 and described herein are merely illustrative and not exhaustive. It should be noted that any number of different specific architectures may be employed without departing from the present invention.

The bus/memory interface device 106 can be used for internal controller or external controller applications. For the internal controller application, the bus/memory interface device 106 is used as a bridge between a host PCI bus and an internal PCI bus. With the bus/memory interface device 106, data can be routed from an internal I/O controller coupled to a disk drive to an internal PCI bus, from the internal PCI bus to a cache memory, and from the cache memory to a host PCI bus which communicates with a host. The internal I/O controller can for example be a Fibre Channel controller or a SCSI controller. While in an internal controller application the bus/memory interface device 106 provides bridging functions to a host, in an external array controller application the bus/memory interface device 106 can provide other bridging functions such as bridging to a variety of I/O controllers and even to other bus/memory interface devices 106. Alternatively, in an external tape controller application, the bus/memory interface device 106 can be used primarily for interfacing a tape controller to a cache memory in connection with error code correction. A variety of internal and external controller applications using the bus/memory interface device 106 may be employed without departing from the present invention.

Figure 3:
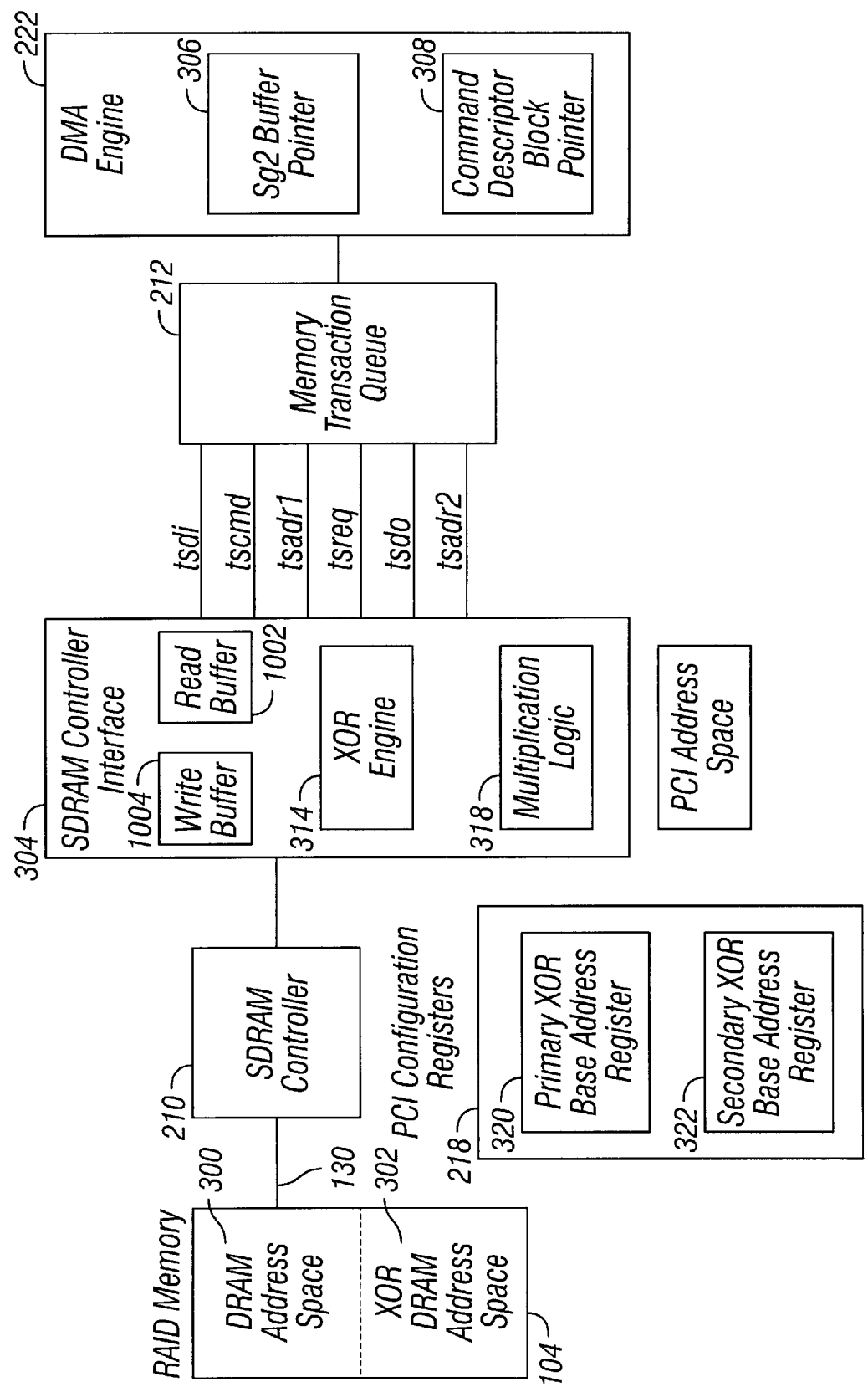
FIG. 3 is a block diagram of exemplary internal components of the bus/memory interface device of FIG. 1 related to DATUM RAID operations.
Figure 10:
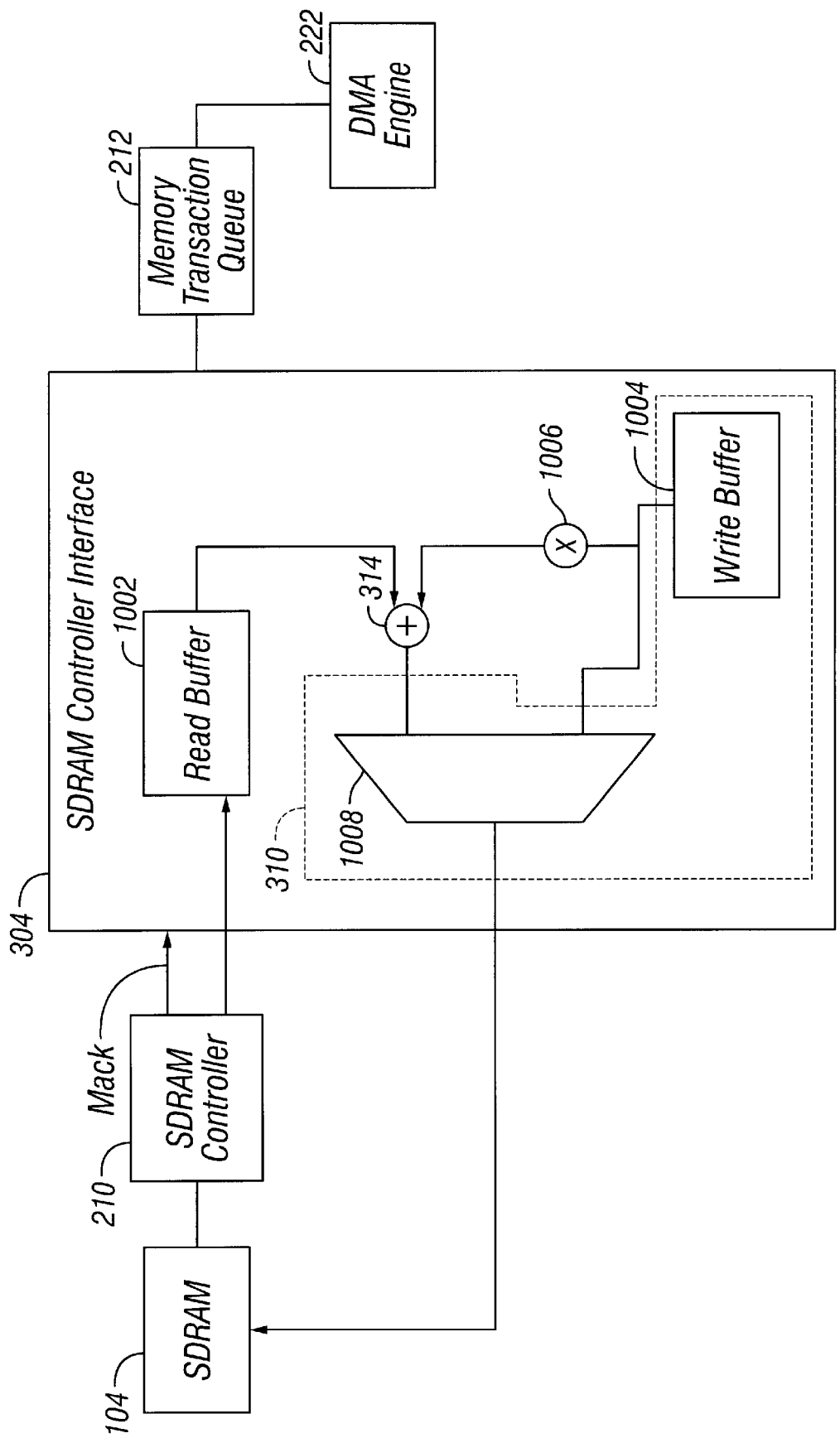
FIG. 10 is a schematic diagram of exemplary internal components of the bus/memory interface device of FIG. 1 related to DATUM RAID operations to synchronous DRAM using a read buffer and pipelining of SDRAM burst read data.

Referring to FIG. 3, circuitry of the bus/memory interface device 106 used in connection with performing DATUM RAID operations with a DATUM multiplier are shown. The SDRAM controller 210 is coupled to the SDRAM 104 which serves as the RAID memory. The SDRAM 104 is organized into a DRAM address space 300 and an XOR DRAM address space 302. In a disclosed embodiment, the DRAM address space 300 and the XOR DRAM address space 302 are 64-bit address spaces. The SDRAM controller 210 controls data flow between the SDRAM 104 and an SDRAM controller interface 304. The SDRAM controller interface 304, which serves as a memory interface controller, includes a write buffer 1004, a read buffer 1002, an XOR engine 314 and multiplication logic 318. The SDRAM controller interface 304 controls data flow between the SDRAM controller 210 and the memory transaction queue 212. The SDRAM controller 210 and the SDRAM controller interface 304 can be distinct components or can be integrated as one component. The SDRAM controller interface 304 includes a write buffer 1004 (FIG. 10) and a read buffer 1002 (FIG. 10). While a single memory transaction queue 212 is shown in FIG. 3, it should be understood that the bus/memory interface device 106 supports multiple memory transaction queues 212.

A variety of interface signals are provided between the memory transaction queue 212 and the SDRAM controller interface 304. A tsreq signal is a signal from the memory transaction queue 212 to the SDRAM controller interface 304 to request a transaction. A tscmd signal is a signal from the memory transaction queue 212 to the SDRAM controller interface 304 to indicate the transaction command type. Examples of transaction command types include MOVE, MOVE_XOR, XOR, and DATUM_XOR. A MOVE_XOR command takes source data from the SDRAM 104 and XORs the source data with destination data in the SDRAM 104. A DATUM_XOR command takes source data from the memory transaction queue 212 (data originating from outside the SDRAM 104) and XORs the source data with destination data in the SDRAM 104. A tsadr1 signal is a transaction address signal from the memory transaction queue 212 to the SDRAM controller interface 304. A tsadr2 is also a transaction address signal from the memory transaction queue 212 to the SDRAM controller interface 304. For MOVE operations, the tsadr1 signal carries the read address and the tsadr2 signal carries the write address. As explained below, the tsadr1 signal is also used to define a DATUM multiplier for DATUM RAID operations by the bus/memory interface device 106. A tsdo signal is a data out signal for carrying data from the memory transaction queue 212 to the SDRAM controller interface 304. A tsdi signal is a data in signal for carrying data from the SDRAM controller interface 304 to the memory transaction queue 212. The memory transaction queue 212 and the SDRAM controller 210 are also described above in connection with FIG. 1.

The memory transaction queue 212 decodes DMA commands from the DMA engine 222. The DMA engine 222 operates in both the DRAM address space 300 and the XOR DRAM address space 302. The DMA engine 222 is used in performing MOVE and MOVE_XOR operations. Certain MOVE commands are handled by the DMA engine 222, while other MOVE commands are handled by the SDRAM controller interface 304. Requests for DATUM RAID operations are transparent to the DMA engine 222. The DMA engine 222 includes an SG2 buffer pointer register 306 and a command descriptor block pointer register 308. Description of operating registers of the DMA engine 222 unrelated to DATUM RAID operations are omitted for sake of clarity. The SG2 buffer pointer register 306 points to an address of an SG2 buffer used as either a source buffer or a destination buffer. The command descriptor block pointer register 308 points to a command descriptor block and can indicate the address space of the command descriptor block. The command description block contains the command to be executed by the DMA engine 222. A field is defined in the command descriptor block for the address of the SG2 buffer.

Figure 4:
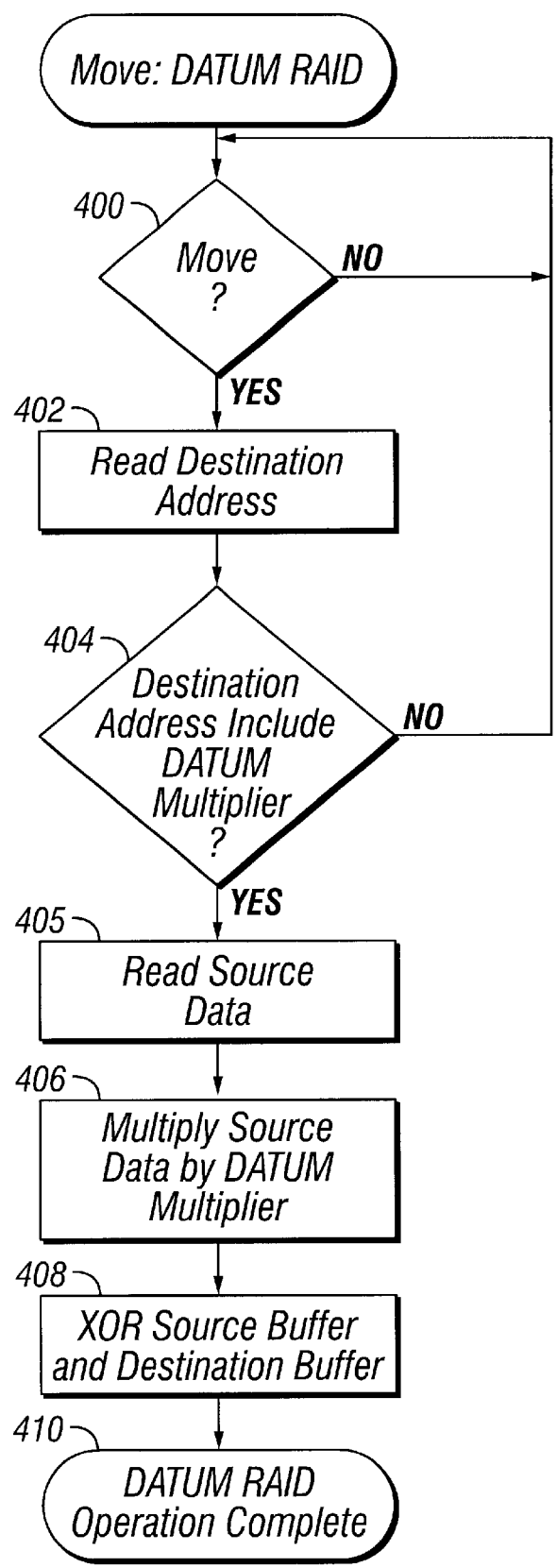
FIG. 4 is a flowchart of an exemplary DATUM RAID operation using a DATUM multiplier and based on a move command.

DATUM RAID operations are performed by the SDRAM controller interface 304. From the perspective of the SDRAM controller interface 304, there are two approaches to handling XORing for DATUM RAID operations. XORing for DATUM RAID operations can be performed in connection with a MOVE command or in connection with a PCI write command. Referring to FIG. 4, a DATUM RAID process in connection with a MOVE command is shown. A MOVE command is a command to move the contents of a source buffer to a destination buffer. The destination buffer can be in the XOR DRAM address space 302. Beginning in step 400, it is determined if a MOVE command is detected by the DMA engine 222. If a MOVE command is not detected, control remains in step 400. If a MOVE command is detected, then control proceeds to step 402 where the tsadr2 signal containing the destination address is read. In a disclosed embodiment, the tsadr2 signal is a 40-bit signal in which address bits 39–32 can serve as multiplier bits to store a DATUM multiplier. The address of the SG2 buffer corresponds to the tsadr2 signal. In step 404, it is determined if the destination address includes the DATUM multiplier. When address bits 39–32 of the destination address are set for use as a DATUM multiplier, then a DATUM RAID operation has been requested. In the disclosed embodiment, if any bit of address bits 39–32 is set, then there is a DATUM multiplier. From step 404, control proceeds to step 405, where source data from the source buffer is read. Next, in step 406, the SDRAM controller interface 304 multiplies the source data by the DATUM multiplier. From step 406, control proceeds to step 408 where the contents of the source buffer are XORed with the contents of the destination buffer. The destination data is in the XOR DRAM address space 302. From step 408, the DATUM RAID process terminates in step 410.

Figure 5:
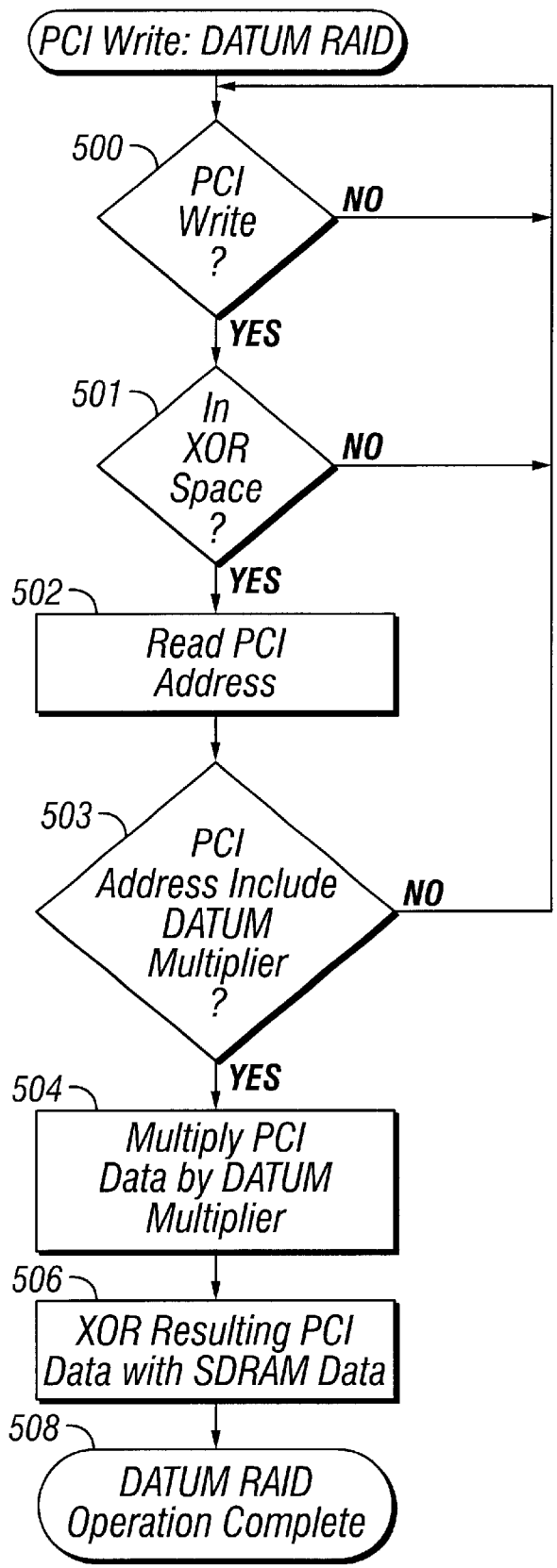
FIG. 5 is a flowchart of an exemplary DATUM RAID operation using a DATUM multiplier and based on a PCI write command.

Referring to FIG. 5, a DATUM RAID process in connection with a PCI write command is shown. Beginning in step 500, it is determined if a PCI write request or command is detected. If not, control remains in step 500. If a PCI write request is detected, then control proceeds to step 501 where it is determined if the PCI address is in the XOR address space. This determination can be made by examining bits 63–40 of the PCI address. Control next proceeds to step 502 where a PCI address associated with the PCI command is read. Next, in step 503, it is determined if the PCI address includes a DATUM multiplier. This can be determined by checking whether any of address bits 39:32 of the PCI address are set. If none of these bits are set, then there is not a DATUM multiplier and control returns from step 503 to step 500. If any of the multiplier bits are set, then a DATUM multiplier is present and control proceeds to step 504. In step 504, the PCI data is multiplied by the DATUM multiplier. From step 504, control proceeds to step 506 where the resulting data from multiplication of the PCI data is XORed with the SDRAM data. The DATUM RAID process terminates in step 508.

Referring to FIGS. 6, 7A and 7B, exemplary hardware description language statements for the multiplication logic 318 of the SDRAM controller interface 304 are shown. The multiplication logic 318 can be used for step 406 of FIG. 4 and step 504 of FIG. 5. Beginning with FIG. 6, on the first row, z[7:0], an 8-bit variable, is an irreducible polynomial for use in transforming the product of two 8-bit variables into an 8-bit product. In this way, bit space is saved in storing the product. The polynomial is also used to generate the product on the fly, saving several clock cycles. FIG. 6 corresponds to an m8bit-stage module.

Figure 8:
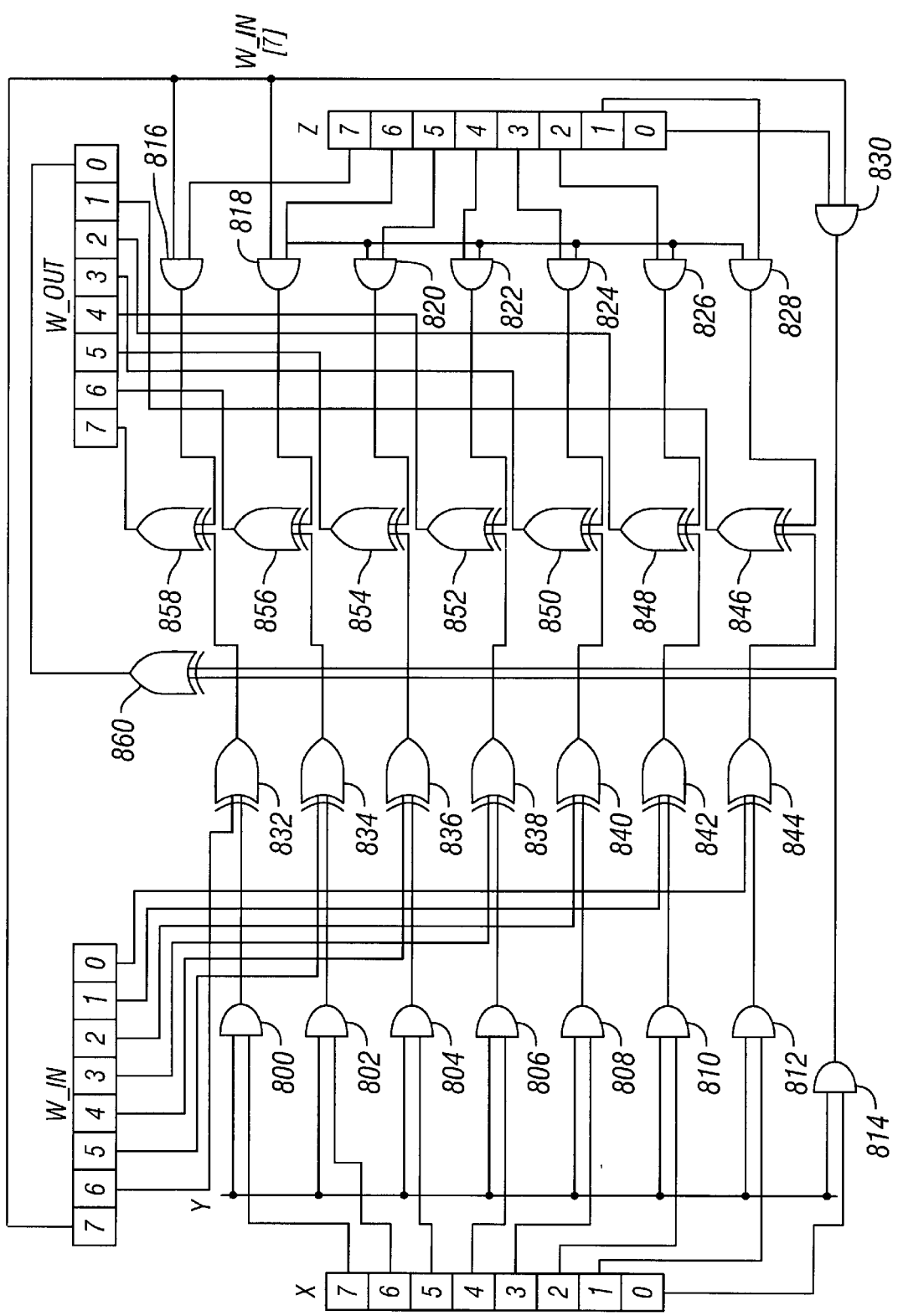
FIG. 8 is a circuit diagram of multiplication logic in accordance with the hardware description language code statements of FIGS. 6, 7A and 7B.

As shown, z[7:0] can be set to the hexadecimal number, 4d. A variety of other hexadecimal numbers can be alternatively be used depending upon design constraints. In the other rows of the table of FIG. 6, the variables w_out[7], w_out[6], w_out[5], w_out[4], w_out[3], w_out[2], w_out[1], and w_out[0] are each defined as a specific combination of AND gates and XOR gates with the input variables w_in[7], w_in[6], w_in[5], w_in[4], w_in[3], w_in[2], w_in[1], w_in[0], x[7], x[6], x[5], x[4], x[3], x[2], x[1], z[7], z[6], z[4], z[3], z[2], z[1], z[0] and y. Those skilled in the art will appreciate that the multiplication logic 318 associated with the Verilog statements in FIG. 6 is shown in FIG. 8. For FIG. 6, it is understood that the Verilog operator "^" represents an XOR gate and that the Verilog operator "&" represents an AND gate. The w_in variable represents the initial source data, and the w_out variable represents the manipulated source data. The y variable represents the DATUM multiplier, and the x variable represents the destination data.

Referring to FIG. 8, the multiplication logic 318 associated with the output variables w_[7], w_out[6], w_out[5], w_out[4], w_out[3], w_out[2], w_out[1] and w_out[0] are shown. The variable x[7] and y are inputs to an AND gate 800. The output of the AND gate 800 and w_in[6] are inputs to an XOR gate 832. The z[7] variable and w_in[7] are inputs to an AND gate 816. The output of the AND gate 816 and the output of the XOR gate 832 are inputs to an XOR gate 858. The w_out[7] variable is the output of the XOR gate 858. The variable x[6] and y are inputs to an AND gate 802. The output of the AND gate 802 and w_in[5] are inputs to an XOR gate 834. The z[6] variable and w_in[7] are inputs to an AND gate 818. The output of the AND gate 818 and the output of the XOR gate 834 are inputs to an XOR gate 856. The w_out[6] variable is the output of the XOR gate 856.

The variable x[5] and y are inputs to an AND gate 804. The output of the AND gate 804 and w_in[4] are inputs to an XOR gate 836. The variable z[5] and w_in[7] are inputs to an AND gate 820. The output of the AND gate 820 and the output of the XOR gate 836 are inputs to an XOR gate 854. The w_out[5] variable is the output of the XOR gate 854. The variable x[4] and y are inputs to an AND gate 806. The output of the AND gate 806 and w_in[3] are inputs to an XOR gate 838. The variable z[4] and w_in[7] are inputs to an AND gate 822. The output of the AND gate 822 and the output of the XOR gate 838 are inputs to an XOR gate 852. The w_out[4] variable is the output of the XOR gate 852.

The variable x[3] and y are inputs to an AND gate 808. The output of the AND gate 808 and w_in[2] are inputs to an XOR gate 840. The variable z[3] and w_in[7] are inputs to an AND gate 824. The output of the AND gate 824 and the output of the XOR gate 840 are inputs to an XOR gate 850. The w_[3] variable is the output of the XOR gate 850. The variable x[2] and y are inputs to an AND gate 810. The output of the AND gate 810 and w_in[1] are inputs to an XOR gate 842. The variable z[2] and w_in[7] are inputs to an AND gate 826. The output of the AND gate 826 and the output of the XOR gate 842 are inputs to an XOR gate 848. The w_out[2] variable is the output of the XOR gate 848.

The variable x[1] and y are inputs to an AND gate 812. The output of the AND gate 812 and w_in[0] are inputs to an XOR gate 844. The variable z[1] and w_in[7] are inputs to an AND gate 828. The output of the AND gate 828 and the output of the XOR gate 844 are inputs to an XOR gate 846. The w_out[1] variable is the output of the XOR gate 846. The variable x[0] and y are inputs to an AND gate 814. The variable z[0] and w_in[7] are inputs to an AND gate 830. The output of the AND gate 830 and the output of the AND gate 814 are inputs to an XOR gate 860. The output of the XOR gate 860 is w_[0].

The multiplication logic 318 in FIG. 8 corresponds to an m8bit_stage module which contains the "multiplication" algorithm. The Verilog statements in FIGS. 7A and 7B correspond to an m8bit module which defines the cycling of the m8bit stage module. As the name implies, the multiplication logic 318 provides eight stages of logic. The m8bit module initiates the m8_bit stage module eight times. The name m8_bit_stage_7 represent stage?7 of the logic. Other logic stages are named in a similar fashion. Each stage is represented by a Verilog module for modeling the logic.

The DATUM multiplication is performed in a data byte-wise basis. Each byte of source data goes through the eight stages of logic. The relationship between the stages, ranging from stage_7 to stage_0, and the structure of each stage are represented in FIGS. 7A and 7B. The inputs to stage_7 are zero as an 8-bit hexadecimal number, x[7:0], y[7], and z[7:0]. The w_out 7 signal is an output of stage_7 and an input to stage_6. Other signals are referenced in a similar fashion. The other inputs to stage _6 are x[7:0], y[6], and z[7:0]. The w_out_6 signal is an output of stage_6 and an input to stage_5. The other inputs to stage_5 are x[7:0], y[5], and z[7:0]. The w_out_5 signal is an output of stage 5 and an input to stage_4. The other inputs to stage_4 are x[7:0], y[4] and z[7:0]. The w_out_4 signal is an output of stage 4 and an input to stage_3. The other inputs to stage_3 are x[7:0], y[3], and z[7:0]. The w_out_3 signal is an output of stage 3 and an input to stage_2. The other inputs to stage_2 are x[7:0], y[2], and z[7:0]. The w_out_2 signal is an output of stage_2 and an input of stage_1. The other inputs to stage_1 are x[7:0], y[1] and z[7:0]. The w_out_1 signal is an output of staged and an input to stage$_0$. The other inputs to stage_0 are x[7:0], y[0] and z[7:0]. The output of stage_0 is w_out_0[7:0]. This output is the final multiplied value representing the multiplied source data.

It should be understood that the multiplication logic described above is only illustrative. While the multiplier is described as an 8-bit variable, alternatively, a different number of bits can be used for the multiplier. While eight stages of multiplication logic are described, alternatively, a different number of logic stages can be used. While the disclosed embodiment is described in the context of a storage controller, it should be appreciated that the disclosed DATUM multiplication techniques can be applied to other systems involving RAID operations. While the multiplication logic is described in terms of AND gates and XOR gates, it should be understood that the multiplication logic can alternatively be implemented with other combinational logic.

Figure 9:
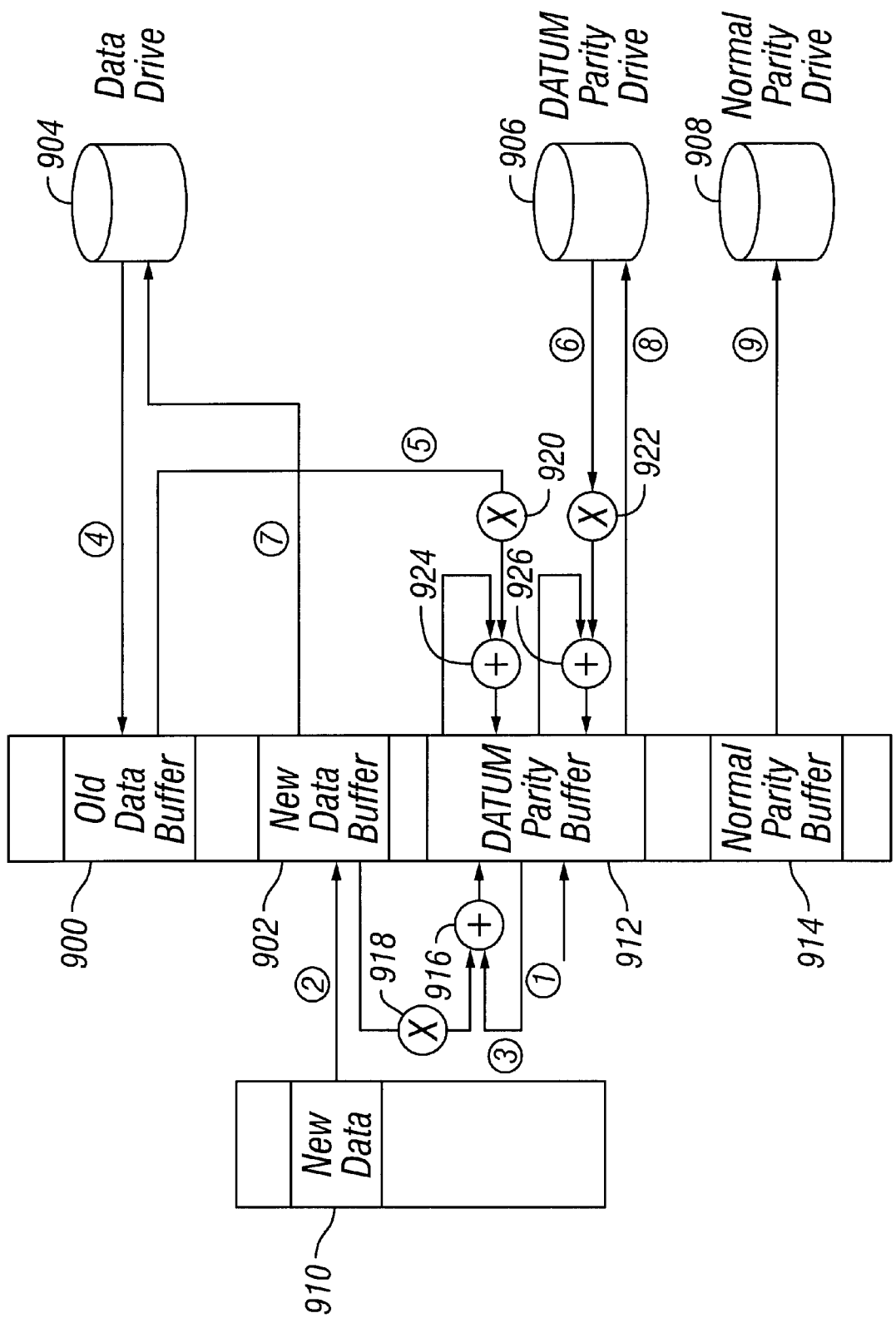
FIG. 9 is a schematic diagram of an exemplary DATUM RAID rebuilding process using a DATUM multiplier.

Referring to FIG. 9, an exemplary DATUM RAID rebuilding process using a DATUM multiplier is shown. For purposes of this figure, an encircled multiplication sign represents a DATUM multiplication operation and an encircled plus sign represents an XOR operation. The multiplication logic 318 handles the DATUM multiplication operations, and the XOR engine 314 handles the XOR operations. FIG. 9 shows new data 910, an old data buffer 900, a new data buffer 902, a DATUM parity buffer 912, a normal parity buffer 914, a data drive 904, a DATUM parity drive 906, and a normal parity drive 908. The DATUM parity buffer 912 and the normal parity buffer 914 reside in the XOR DRAM address space 302. The old data buffer 900 and the new data buffer 902 reside in the SDRAM 104. In accordance with the illustrated DATUM RAID rebuilding process, data can be recovered in the case of multiple data drive failures using the single data drive 904, the normal parity drive 908 and the DATUM parity drive 906. Traditional RAID4 and RAID5 schemes have only tolerated a single drive failure. For example, in the case of a traditional RAID4 architecture containing five data drives and one parity drive, the architecture cannot tolerate two or more data drive failures.

Beginning in step 1, the DATUM parity buffer 912 is filled with zeros using the DMA engine 222. Next, in step 2, the new data 910 is transferred to the new data buffer 902 using the DMA engine 222. In the context of the bus/memory interface device 106, the new data is provided from a host via the primary PCI bus 102 and the old data is provided from a SCSI controller for a disk drive via the secondary PCI bus 108. From step 2, control proceeds to step 3 where new data from the new data buffer 902 is multiplied by a DATUM multiplier operator 918 and then XORed by an XOR operator 916 with data from the DATUM parity buffer 912. In the disclosed embodiment, if the multiplier bits are set to '0' then a normal write operation is performed. If the multiplier bits are set '1', then a normal XOR operation is performed. If the multiplier bits are not set to '0' or '1', then a DATUM XOR operation is performed.

Next, in step 5, old data from the read buffer 900 is multiplied by a DATUM multiplier operator 920 and then XORed by an XOR operator 924 with the contents of the DATUM parity buffer 912. The parity data resulting from the XOR operation is placed into the DATUM parity buffer 912. The multiplier associated with the DATUM multiplier operator 920 is the inverse of the multiplier associated with the DATUM multiplier operator 918. In this way, the new data is multiplied by the desired DATUM multiplier and the old data is multiplied by the inverse of the desired DATUM multiplier. As an alternative to copying old data from the data drive 904 to memory (old data buffer 900) and then DATUM multiplying the old data and XORing the multiplied old data with the contents of the DATUM parity buffer 912, the old data can alternatively be provided directly from the data drive 904 to the DATUM multiplier 920. In the context of the bus/memory interface device 106, old data can be provided from the data drive 904 directly to the DATUM parity buffer 912 using a primary XOR base address register 320 or a secondary XOR base address register 322. Either register can be used for defining a 1-terabyte (TB) window to decode XOR accesses to the DRAM 104. Further, either register can be used to defme an upper 24-bit address of a 64-bit base address range that is decoded for XOR accesses to the DRAM 104. In the context of the bus/memory interface device 106, either register provides DATUM XOR addressability from the PCI bus 102 or 108.

From step 5, control proceeds to step 6 where parity data from the DATUM parity drive 906 is multiplied by a DATUM multiplier operator 922 and then XORed by an XOR operator 926 with the current contents of the DATUM parity buffer 912. Next, in step 7, new data in the write buffer 902 is copied to the data drive 904. In step 8, the new DATUM parity data is copied from the DATUM parity buffer 912 to the DATUM parity drive 906. In step 9, the normal parity data is copied from the normal parity buffer 914 to the normal parity drive 908. The parity data in the normal parity buffer 914 can be generated by standard RAID5 XOR techniques. The parity data is typically the XORed data of all data drives of the array.

Thus, the disclosed exemplary DATUM RAID rebuilding process provides for two linearly independent equations or vectors with two unknowns. One equation corresponding to DATUM parity can be represented by Ax+By=P0. The x and y variables represent the failed data drives, and P0 represents the DATUM parity data. The second equation corresponding to normal parity (e.g. traditional RAID5 XOR parity) can be represented by Cx +Dy=P1. For RAID5 XOR parity, C is equal to 1 and D is equal to 1. P1 represents the normal parity, and the constants A and B are multipliers for the DATUM multiplication. Since there are two linearly independent equations with two unknowns, the failed data drives x and y can be recovered.

It should be understood that the number of data drives which can be protected in accordance with the disclosed DATUM RAID rebuilding process may depend upon the number of bytes in the DATUM multiplier. Further, it should be understood that the number of data drives which can be protected in accordance with the disclosed DATUM RAID rebuilding process may depend upon the number of linearly independent equations which can be generated in connection with the DATUM multiplier.

Referring to FIG. 10, circuitry of the bus/memory interface device 106 used in connection with performing RAID XOR operations to synchronous DRAM is shown. The SDRAM controller 210, the SDRAM controller interface 304, the memory transaction queue 212 and the DMA engine 222 are components of the bus/memory interface device 106. The SDRAM controller 210 is coupled to the SDRAM 104 and to the SDRAM controller interface 304. The SDRAM controller interface 304 includes a read buffer 1002, a write buffer 1004, and an XOR engine 314 used in connection with performing RAID XOR operations to the SDRAM 104. RAID XOR operations to the SDRAM 104 (serving as a RAID memory) are accomplished by performing external read-modify-write cycles to the SDRAM 104.

The write buffer 1004 is used to store write data to be XORed with read data from the SDRAM 104. The read buffer 1002 is used to store read data from the SDRAM 104. The SDRAM controller 210 provides read data from the SDRAM 104 to the read buffer 1002. Data read from the SDRAM 104 is "pipelined" in the read buffer 1002 in the sense that data read in response to consecutive multiple SDRAM burst read requests is stored in the read buffer 1002. For example, if the burst length is set to 4 beats or data phases, then 32 bytes can be stored in the read buffer 1002 in response to 8 consecutive SDRAM burst read requests.

An SDRAM burst read involves CAS (column address strobe) latency before receipt of the data from the SDRAM 104. By pipelining the data, CAS latency of all SDRAM burst reads except the first SDRAM burst read is hidden. In other words, during the CAS latency of an SDRAM burst read operation other than the first SDRAM burst read, data is being received with respect to a previous SDRAM burst read. Also, during the latency of an SDRAM burst read operation, a next SDRAM burst read request can be issued. This pipelining scheme utilizes an acknowledge signal MACK provided from the SDRAM controller 210 to the SDRAM controller interface 304. This signal indicates to the SDRAM controller interface 304 that the SDRAM controller 210 is ready to accept another SDRAM burst read request. The acknowledge signal MACK is activated before data is actually transferred out of the SDRAM 104 so there is not a dead cycle between consecutive read burst cycles. Data can be repeatedly pipelined until the read buffer 1002 is fall or the desired amount of data is stored. By bursting consecutive SDRAM burst reads, there are fewer turn-around or dead cycles on the memory bus of the SDRAM 104. In a disclosed embodiment in which the burst length is set to 4 beats or data phases, up to 8 SDRAM burst read requests can be executed consecutively, creating an effective SDRAM burst length of 256 bytes. Rather than programming the SDRAM controller 210 with a relatively large SDRAM burst length, which might waste memory bandwidth on small transactions, a relatively small SDRAM burst length is programmed. The relatively small SDRAM burst length is effectively extended through the pipelining techniques described above. It should be understood that both RAID XOR operations and memory-to-memory operations can benefit from use of the read buffer 1002.

The XOR engine 314, represented by an encircled plus sign, XORs write data from the write buffer 1004 with data from the read buffer 1002. The resulting data from the XOR operation is provided through a write interface 1008 to the SDRAM 104. The write interface 1008 and the write buffer 1004 collectively represent the write engine 310. In a disclosed embodiment, the write buffer 1004 is a 72 bits wide×8 entries deep FIFO and the read buffer 1002 is a 256-byte (8 bytes wide×32 entries deep) FIFO with thirty-two 64-bit entries. The write data in the write buffer 1004 can be PCI data presented to the bus/memory interface device 106 from the PCI bus 102 or 106.

Thus, the SDRAM controller interface 304 includes the read buffer 1002 to receive and pipeline data from the synchronous DRAM 104 in response to consecutive SDRAM burst read requests, the write buffer 1004 to store write data, the exclusive or engine 314 to XOR the write data with the data from the read buffer 1002, and the write interface 1008 to write the resulting data to the synchronous DRAM 104.

The foregoing disclosure and description of the various embodiments are illustrative and explanatory thereof, and various changes in the logic, stages, variables, addressing, architecture, signals, hardware description language code, data types, number of parameters, code size, field sizes, components and circuitry as well as in the details of the illustrated circuitry and construction and method of operation may be made without departing from the spirit of the invention.

We claim:

1. A method of performing a DATUM RAID operation with a DATUM multiplier, the method comprising the steps of:
    reading a destination address including a DATUM multiplier;
    reading source data;
    multiplying the source data by the DATUM multiplier; and
    XORing resulting data from the multiplying step with destination data associated with the destination address.

2. The method of claim 1, wherein the destination data is in an XOR memory address space.

3. The method of claim 1, wherein the source data is in an input/output address space.

4. The method of claim 1, the reading a DATUM multiplier step comprising the step of:
    reading a DATUM multiplier in response to detection of a memory command.

5. The method of claim 4, wherein the memory command is a type of XOR command.

6. The method of claim 4, wherein the memory command is a command to move data to an XOR memory address space.

7. The method of claim 1, the multiplying step comprising the step of:
    cycling the source data through a plurality of multiplication stages corresponding to the number of bits of the DATUM multiplier.

8. A memory interface controller adapted for performing DATUM RAID operations with a DATUM multiplier, the controller comprising:
    a means for reading a destination address including a DATUM multiplier;
    a means for reading source data;
    a means for multiplying the source data by the DATUM multiplier; and
    a means for XORing destination data associated with the destination address with resulting data produced by the means for multiplying the source data.

9. The controller of claim 8, wherein the destination data is in an XOR memory address space.

10. The controller of claim 8, wherein the source data is in an input/output address space.

11. The controller of claim 8, the means for multiplying comprising:
    a means for cycling the source data through a plurality of multiplication stages corresponding to the number of bits of the DATUM multiplier.

12. A system adapted for performing DATUM RAID operations, the system comprising:
    a memory; and
    a bus/memory interface device, comprising;
        an input/output address space,
        a memory controller coupled to the memory;
        a normal memory address space associated with the memory;
        an XOR memory address space associated with the memory;
        a direct memory access engine operable in the normal memory address space, the XOR memory address space and the input/output address space, the direct memory access engine operable to move data to the XOR memory address space; and
        a memory interface controller coupled between the direct memory access engine and the memory controller, the memory interface controller comprising:
            a means for reading a destination address including a DATUM multiplier;
            a means for selectively reading source data from the input/output address space;
            a means for multiplying the source data by the DATUM multiplier; and
            a means for XORing destination data associated with the destination address with resulting data from multiplying the source data.

13. The system of claim 12, wherein the destination data is in the XOR memory address space.

14. The system of claim 12, wherein the source data is in the input/output address space.

15. The system of claim 12, the means for reading a DATUM multiplier comprising:
    a means for reading a DATUM multiplier in response to the direct memory access engine detecting a memory command.

16. The system of claim 15, wherein the memory command is a type of XOR command.

17. The system of claim 15, wherein the memory command is a command to move data to the XOR memory address space.

18. The system of claim 12, the bus/memory interface device comprising:
    an XOR base address register to define the XOR memory address space.

19. The system of claim 12, the means for multiplying comprising:
    a means for cycling the source data through a plurality of multiplication stages corresponding to the number of bits of the DATUM multiplier.

20. A memory interface controller adapted for performing DATUM RAID operations with a DATUM multiplier, the controller comprising:

a read engine configured to read source data and a destination address including a DATUM multiplier;

multiplication logic configured to multiply the source data by the DATUM multiplier; and an XOR engine configured to XOR resulting data produced by the multiplication logic with destination data corresponding to the destination address.

21. The controller of claim 20, wherein the destination data is in an XOR memory address space.

22. The controller of claim 20, wherein the source data is in an input/output address space.

23. A method of performing a DATUM RAID operation with a DATUM multiplier, the method comprising the steps of:

reading an input/output bus address including a DATUM multiplier;

multiplying the input/output bus data associated with the input/output bus address by the DATUM multiplier; and XORing resulting data from the multiplying step with data from a memory.

24. The method of claim 23, wherein the input/output bus address comprises a PCI address and the input/output bus data comprises PCI data.

25. The method of claim 23, the reading step comprising the step of:

reading an input/output bus address including a DATUM multiplier in response to detection of an input/output bus write command.

* * * * *